United States Patent
Clarke et al.

(10) Patent No.: US 12,552,517 B2
(45) Date of Patent: Feb. 17, 2026

(54) SUPPORT STRUCTURE FOR AN AIRCRAFT

(71) Applicant: The Boeing Company, Chicago, IL (US)

(72) Inventors: Victoria A. Clarke, Seattle, WA (US); Olaf Weckner, Everett, WA (US); Jay D. Smith, Snohomish, WA (US); Cynthia T. Parrish, Edmonds, WA (US); Erik A. Phillips, Kirkland, WA (US); Christopher J. Deatrick, Everett, WA (US); Andy Anh Q Le, Bothell, WA (US); Jeff E. Barnes, Shoreline, WA (US)

(73) Assignee: The Boeing Company, Arlington, VA (US)

( * ) Notice: Subject to any disclaimer, the term of this patent is extended or adjusted under 35 U.S.C. 154(b) by 188 days.

(21) Appl. No.: 17/869,918

(22) Filed: Jul. 21, 2022

(65) Prior Publication Data
US 2024/0025532 A1   Jan. 25, 2024

(51) Int. Cl.
*B64C 3/26* (2006.01)
*B64C 3/18* (2006.01)
*B64F 5/40* (2017.01)

(52) U.S. Cl.
CPC ............... *B64C 3/26* (2013.01); *B64C 3/18* (2013.01); *B64F 5/40* (2017.01)

(58) Field of Classification Search
CPC .. B64C 3/18; B64C 3/26; B64C 3/187; B64C 1/1446; B64C 1/1492
See application file for complete search history.

(56) References Cited

U.S. PATENT DOCUMENTS

| | | | |
|---|---|---|---|
| 6,808,143 B2 | 10/2004 | Munk et al. | |
| 8,286,323 B2 | 10/2012 | Toh et al. | |
| (Continued) | | | |

FOREIGN PATENT DOCUMENTS

| | | | | |
|---|---|---|---|---|
| CA | 2911133 C | * | 6/2019 | ............. B64C 1/064 |
| CN | 113044204 A | * | 6/2021 | ............... B64C 3/18 |
| (Continued) | | | | |

OTHER PUBLICATIONS

Zucco et al.,"Continuous Tow Steering around an Elliptical Cutout in a Composite Panel", Jan. 4, 2021.

*Primary Examiner* — Magdalena Topolski
*Assistant Examiner* — Anna L. Gordon
(74) *Attorney, Agent, or Firm* — Joseph M. Butscher; Carroll, Hoette & Butscher, LLC

(57) ABSTRACT

A support structure for an aircraft includes a structural member having a generally planar shape, a longitudinal axis defining a longitudinal direction and a transverse axis orthogonal to the longitudinal axis, and a plurality of rounded holes formed along the longitudinal direction. Each rounded hole has a respective major axis with a major length and a minor axis orthogonal to the major axis with a minor length that is less than the major length. Each rounded hole is oriented with its major axis rotated more than 0 degrees and less than 90 degrees from the longitudinal axis of the structural member. The structural member is configured for bearing external loads acting on the structural member in a principal loading direction that is not parallel with the longitudinal axis or the transverse axis. Each rounded hole may be oriented with its major axis aligned generally parallel with the principal loading direction.

21 Claims, 4 Drawing Sheets

(56) References Cited

U.S. PATENT DOCUMENTS

| | | | |
|---|---|---|---|
| 9,511,496 B2 | 12/2016 | Sarh et al. | |
| 9,580,120 B2 | 2/2017 | Podnar | |
| 9,987,823 B2 | 6/2018 | Eli Eli et al. | |
| 10,322,791 B2 | 6/2019 | Evans | |
| 11,007,637 B2 | 5/2021 | Gunther | |
| 11,279,498 B2 | 3/2022 | Petit et al. | |
| 11,312,472 B2 | 4/2022 | Brakes | |
| 2003/0234322 A1* | 12/2003 | Bladt | B64C 1/1484 |
| | | | 244/129.3 |
| 2007/0069079 A1 | 3/2007 | Rassaian et al. | |
| 2012/0223187 A1 | 9/2012 | Kismarton | |
| 2014/0377500 A1* | 12/2014 | Kashiwagi | B29C 70/30 |
| | | | 29/419.1 |
| 2017/0225769 A1* | 8/2017 | Carlson | B32B 7/12 |
| 2021/0300521 A1 | 9/2021 | Peacock et al. | |
| 2022/0001973 A1 | 1/2022 | Block et al. | |

FOREIGN PATENT DOCUMENTS

| | | | | |
|---|---|---|---|---|
| CN | 113060273 A | 7/2021 | | |
| EP | 3150484 A1 | 4/2017 | | |
| EP | 3150484 B1 * | 12/2018 | | B29C 70/48 |
| FR | 3030443 A1 | 6/2016 | | |
| RU | 2469907 C2 * | 12/2012 | | B64C 1/12 |
| WO | 2006032754 A1 | 3/2006 | | |

* cited by examiner

SUPPORT STRUCTURE FOR AN AIRCRAFT

INTRODUCTION

This disclosure relates generally to support structures for aircrafts.

Fixed-wing aircrafts may have a wingbox structure forming each of its wings. Such wingbox structures may include a skeleton or frame formed by ribs, spars and stringers covered by an upper skin and a lower skin.

The ribs, spars and lower skin in particular are often designed with a number of rounded access holes through them. These holes permit the passage of hydraulic, electrical and fuel lines through the holes, or permit access therethrough for personnel performing maintenance and repair work on the wings of the aircraft.

SUMMARY

According to one embodiment, a support structure for an aircraft includes a structural member having a generally planar shape, a longitudinal axis and a transverse axis orthogonal to the longitudinal axis, and a plurality of rounded holes formed along the longitudinal direction of the structural member. Each of the rounded holes has a respective major axis with a major length therealong, and a minor axis orthogonal to the major axis with a minor length therealong that is less than the major length, with each of the rounded holes being oriented with its major axis rotated more than 0 degrees and less than 90 degrees from the longitudinal axis of the structural member.

Each of the rounded holes may have a respective shape, and each respective shape may be an ellipse, a Grodzinski-profiled hole, an oval, a rounded rectangle, a stadium, a rounded rhombus or a rounded trapezoid. The generally planar shape of the structural member may be generally flat or generally curved, and the longitudinal axis of the structural member may be straight or curved. Additionally, each of the rounded holes may be oriented with its minor axis rotated more than 0 degrees and less than 90 degrees from the transverse axis of the structural member.

In this embodiment, the structural member may be a wingbox component. More specifically, the wingbox component may be one of a rib, a spar, an upper skin and a lower skin, and each of the rounded holes may be an access hole through the wingbox component. Alternatively, the structural member may be a fuselage skin and each of the rounded holes may be a window hole through the fuselage skin.

The structural member may be configured for bearing one or more external loads acting on the structural member in a principal loading direction that is not parallel with the longitudinal axis or the transverse axis. In this configuration, each of the rounded holes may be oriented with its major axis rotated more than 0 degrees and less than or equal to 45 degrees from the principal loading direction, or each of the rounded holes may be oriented with its major axis aligned parallel with the principal loading direction. The structural member may further include a plurality of attachment points configured for interfacing with one or more external members and for receiving the one or more external loads from the external members.

According to another embodiment, a support structure for an aircraft includes: a structural member having a generally planar shape, a longitudinal axis, and a transverse axis orthogonal to the longitudinal axis, wherein the structural member includes a plurality of attachment points configured for interfacing with one or more external members and for receiving one or more external loads from the external members acting on the structural member in a principal loading direction that is not parallel with the longitudinal axis or the transverse axis; and a plurality of rounded holes formed along the longitudinal direction of the structural member, wherein each rounded hole has a respective major axis with a major length therealong and a minor axis orthogonal to the major axis with a minor length therealong that is less than the major length, wherein each of the rounded holes is oriented with its major axis aligned parallel with the principal loading direction.

In this embodiment, each of the rounded holes may have a respective shape, and each respective shape may be an ellipse, a Grodzinski-profiled hole, an oval, a rounded rectangle, a stadium, a rounded rhombus or a rounded trapezoid. The generally planar shape of the structural member may be generally flat or generally curved, and the longitudinal axis of the structural member may be straight or curved. Each of the rounded holes may be oriented with its major axis rotated more than 0 degrees and less than or equal to 45 degrees from the principal loading direction. The structural member may be a wingbox component comprising one of a rib, a spar, an upper skin and a lower skin, and each of the rounded holes may be an access hole through the wingbox component. Alternatively, the structural member may be a fuselage skin and each of the rounded holes may be a window hole through the fuselage skin.

According to yet another embodiment, a support structure for a wingbox or a fuselage of an aircraft includes: a structural member having a generally planar shape, a longitudinal axis, and a transverse axis orthogonal to the longitudinal axis, wherein the structural member includes a plurality of attachment points configured for interfacing with one or more external members and for receiving one or more external loads from the external members acting on the structural member in a principal loading direction that is not parallel with the longitudinal axis or the transverse axis; and a plurality of generally elliptical holes formed along the longitudinal direction of the structural member, wherein each generally elliptical hole has a respective major axis with a major length therealong and a minor axis orthogonal to the major axis with a minor length therealong that is less than the major length. Each of the generally elliptical holes is oriented with its major axis aligned parallel with the principal loading direction, and the structural member is: (i) a wingbox component comprising one of a rib, a spar, an upper skin and a lower skin, with each of the rounded holes being an access hole through the wingbox component, or (ii) a fuselage skin with each of the rounded holes being a window hole through the fuselage skin.

Each of the generally elliptical holes may have a respective shape, and each respective shape may be an ellipse, a Grodzinski-profiled hole, an oval, a rounded rectangle or a stadium. The generally planar shape of the structural member may be generally flat or generally curved, and the longitudinal axis of the structural member may be straight or curved. Each of the generally elliptical holes may be oriented with its major axis rotated more than 0 degrees and less than or equal to 45 degrees from the principal loading direction.

The above features and advantages, and other features and advantages, of the present teachings are readily apparent from the following detailed description of some of the best modes and other embodiments for carrying out the present teachings, as defined in the appended claims, when taken in connection with the accompanying drawings.

DETAILED DESCRIPTION

Figure 1:
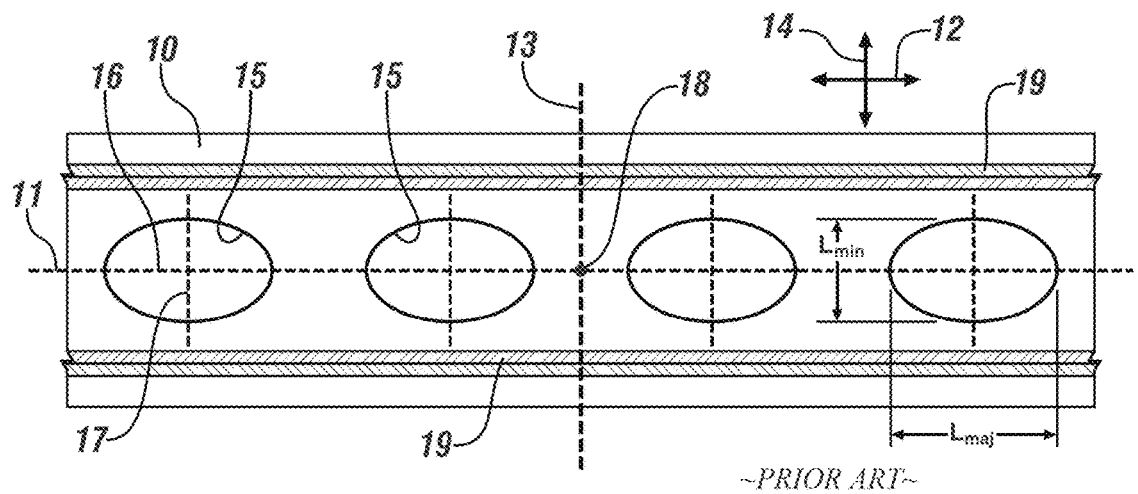
FIG. 1 is a schematic elevation view of a structural member having rounded access holes oriented in a conventional arrangement.

Referring now to the drawings, wherein like numerals indicate like parts in the several views, various embodiments of a support structure 20 for an aircraft 99 are shown and described herein.

FIG. 1 shows a schematic elevation view of a conventional structural member 10 having a number of rounded holes 15 therein, which are oriented in a customary arrangement. The structural member 10 has a generally planar overall shape, with a longitudinal axis 11 extending along a longitudinal direction 12 (shown as leftward-and-rightward in the drawing) and a transverse axis 13 extending along a transverse direction 14 (shown as upward-and-downward in the drawing), with the transverse axis 13 and the transverse direction 14 being orthogonal or perpendicular to the longitudinal direction axis 11 and the longitudinal 12 direction. With the structural member 10 being generally planar in overall shape, the thickness of the structural member 10 (not shown, but extending into and out of the plane of the drawing) is much smaller than the overall length and overall height of the structural member 10.

Each of the rounded holes 15 has a major axis 16 along a major length $L_{maj}$ of the hole 15, and a minor axis 17 along a minor length $L_{min}$ of the hole 15, with the major and minor axes 16, 17 being oriented orthogonal or perpendicular to each other. A center of mass or centroid 18 of each hole 15 is defined at the intersection of the respective major and minor axes 16, 17 of each hole 15. In this conventional structural member 10, note that the major axis 16 of each rounded hole 15 is aligned or parallel with the longitudinal axis 11, and the minor axis 17 of each rounded hole 15 is aligned or parallel with the transverse axis 13. For example, this configuration of a structural member 10 may be used for the lower skin of an aircraft wing, with the holes 15 being arranged with their major axes 16 aligned with the lower skin's longitudinal axis 11, and with the holes 15 serving as access holes to allow service personnel to access hydraulic, mechanical and electrical components that are housed within the structural member 10 and are covered by the lower skin. Stringers 19 are shown running along the lower skin's longitudinal direction 12, with the rounded holes 15 also running along the longitudinal direction 12 (as well as running colinear with the longitudinal axis 11). These rounded access holes 15 may be covered by similarly shaped doors (not shown) which may be securely fastened over the holes 15.

Figure 2:
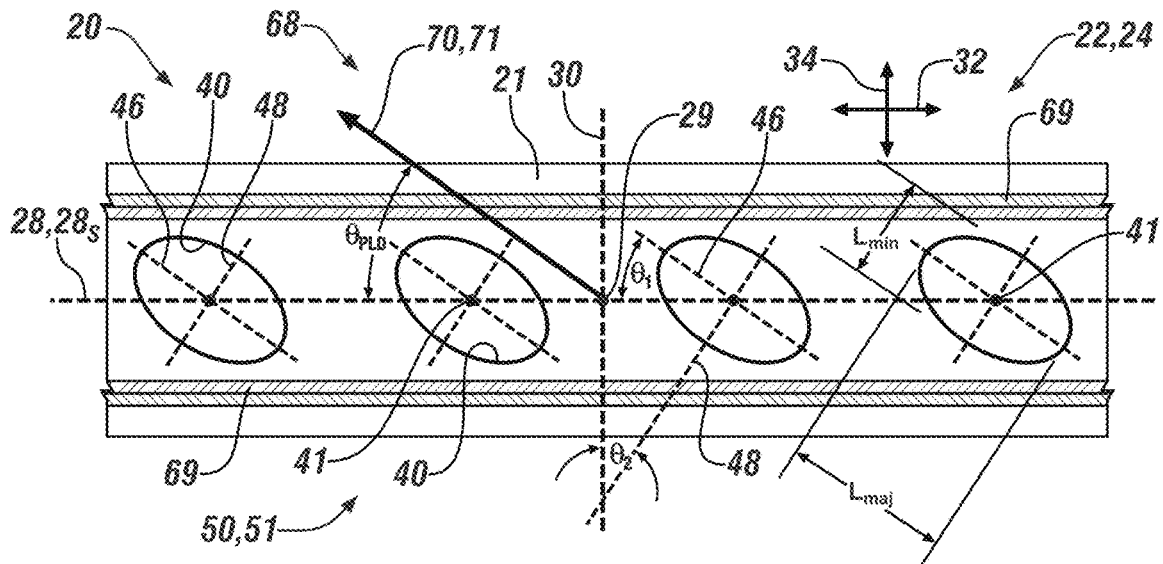
FIG. 2 is a schematic elevation view of a support structure having rounded access holes oriented in an arrangement according to the present disclosure.
Figure 3:
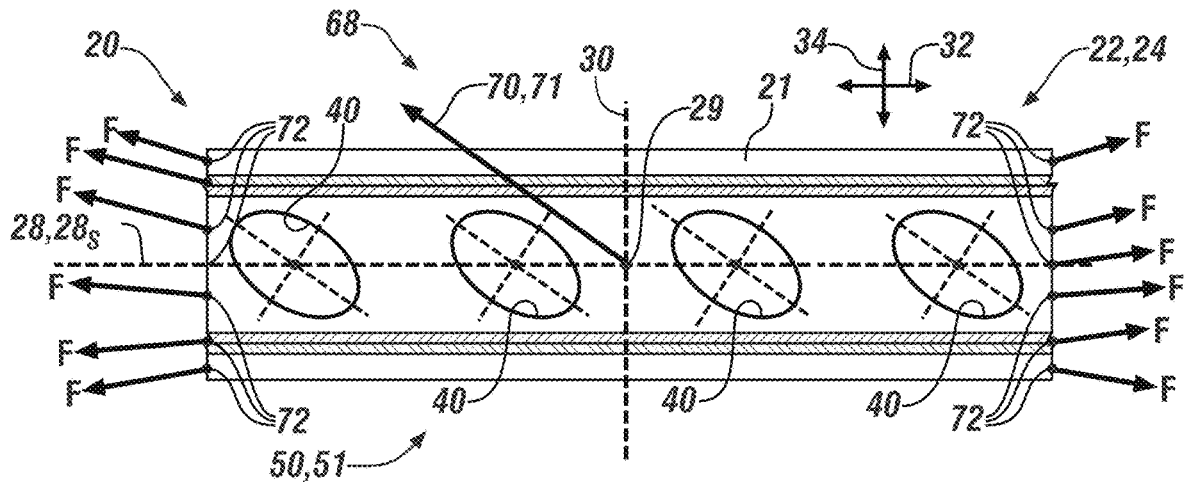
FIG. 3 is a schematic elevation view of the support structure of FIG. 2 showing external loads applied at a plurality of loading points.

This conventional configuration for a structural member 10 may be contrasted with the support structure 20 of the present disclosure, which is illustrated in a first embodiment in FIGS. 2-3. Here, schematic elevation views are shown of a support structure 20 having rounded holes 40 which are intentionally oriented in a manner that is strikingly different from FIG. 1.

Before addressing this difference, some similarities may be noted between the conventional structural member 10 and the instant support structure 20. For example, like the conventional structural member 10, the support structure 20 shown in FIGS. 2-3 includes a structural member 21 having a generally planar shape 22, a longitudinal axis 28 running along the length of the structural member 21, and a transverse axis 30 orthogonal to the longitudinal axis 28 and running along the width of the structural member 21. The longitudinal axis 28 defines a longitudinal direction 32, and the transverse axis 30 defines a transverse direction 34. (Note that, as used herein, the transverse axis 30 may be different from what is sometimes conventionally referred to as the "transverse axis" (or lateral axis) of an aircraft, which is defined as running through an aircraft from wingtip to wingtip. Similarly, the transverse direction 34 may be different from what are sometimes called the "transverse directions" of an aircraft (e.g., port and starboard), which run parallel to the aircraft's "transverse axis".) Additionally, a plurality of rounded holes 40 are formed in the structural member 21 along the longitudinal direction 32. Like the rounded holes 15 of the conventional structural member 10 shown in FIG. 1, the rounded holes 40 of the support structure 20 shown in FIGS. 2-3 each have a major axis 46 with a major length $L_{maj}$ running therealong, and a minor axis 48 orthogonal to the major axis 46 with a minor length $L_{min}$ running therealong, wherein the minor length $L_{min}$ is less than the major length $L_{maj}$ (i.e., $L_{min}<L_{maj}$). These major and minor axes 46, 48 intersect each other at a respective center or centroid 41 of each rounded hole 40.

However, in the support structure 20, each of the rounded holes 40 is oriented such that its major axis 46 is not aligned or parallel with the longitudinal axis 28 of the structural member 21. Instead, the rounded holes 40 are intentionally and purposefully oriented such that their respective major axes 46 are rotated away from the longitudinal axis 28 of the structural member 21. Specifically, their respective major axes 46 are rotated more than 0 degrees and less than 90 degrees from the structural member's longitudinal axis 28.

The purpose of this unconventional orientation of the rotated holes 40 may be seen in FIGS. 2-3. In particular, FIG. 3 shows a view of the support structure 20 of FIG. 2, along with a variety of external loads or forces F applied at a plurality of loading or attachment points 72 on the structural member 21. These external loads F may be due to external members 74 (not shown in FIGS. 2-3, but shown in FIG. 14) that are attached to the structural member 21 at the attachment or loading points 72. For example, the support structure 20 may take the form of various component types 60, such as a lower skin 68 of an aircraft wing having supportive stringers 69 running in the longitudinal direction 28 and a plurality of wingbox components 62 such as ribs 63, spars 64 and an upper skin 66 (not shown in FIGS. 2-3, but shown in FIG. 14) also supporting the wing to form a wingbox. These wingbox components 62 may be attached to the lower skin 68 at various attachment points 72 on the lower skin 68, and may serve as external members 74 which exert forces F on the lower skin 68 at the attachment points 72. Note that FIGS. 2-3 show these external forces F may be vector-summed to produce a single resultant force acting at the center or mass 29 of the structural member 21; this single resultant force may be referred to as a principal load 70 acting in a principal loading direction (PLD) 71. As shown in FIG. 2, the PLD 71 of the principal load 70 may be defined by a PLD direction angle $\theta_{PLD}$ which is an angle between the principal load 70 and the longitudinal axis 28 of the structural member 21.

With the external forces F resolved into a single principal load 70 acting on the structural member 21 in a PLD 71, it may be seen in FIGS. 2-3 that the rounded holes 40 have been oriented such that their respective major axes 46 all point in the same direction as (i.e., parallel to) the PLD 71. For example, FIG. 2 shows that the major axis 46 of each rounded hole 40 may form a first rotation angle $\theta_1$ with the longitudinal axis 28, wherein the first rotation angle $\theta_1$ is congruent to the PLD direction angle $\theta_{PLD}$ (i.e., $\theta_1 \cong \theta_{PLD}$), thus showing that the major axes 46 of the rounded holes 40 are aligned or parallel with the PLD 71.

One reason for orienting the rounded holes 40 with their major axes 46 aligned with the PLD 71 is to enable the entire structural member 21 and support structure 20 to bear the external loads F more efficiently. This can also provide the ability to reduce the weight of the structural member/support structure 21, 20 while still having the desired capacity to bear the external loads F.

In many instances, the attachment/loading points 72, the magnitudes and directions of the various external loads F, and the proximity of other structures immediately around the support structure 20 may be such that the holes 40 may be oriented with their major axes 46 perfectly aligned/parallel with the PLD 71. However, in some cases, other nearby structures (e.g., hydraulic lines, supports, motors, electrical cable bundles, etc.) may interfere with or compromise the ability to perfectly align the major axes 46 of one or more of the holes 40 with the PLD 71, or they may urge or influence the orientation of one or more of the holes 40 such that their major axes 46 are not perfectly aligned with the PLD 71. For example, one or more of the rounded holes 40 may be oriented with their major axes 46 rotated some number of degrees from the PLD 71, such that the first rotation angle $\theta_1$ is different from the PLD direction angle $\theta_{PLD}$ (i.e., $\theta_1 \neq \theta_{PLD}$). For instance, the respective major axes 46 of one or more of the rounded holes 40 may point 5 degrees away from the PLD 71, or 10 degrees away from the PLD 71, or 15 degrees away from the PLD 71, or 20 degrees away from the PLD 71, or 25 degrees away from the PLD 71, or 30 degrees away from the PLD 71, or 35 degrees away from the PLD 71, or 40 degrees away from the PLD 71, or 45 degrees away from the PLD 71, etc., including other increments such as 1, 2, 3 or 4 degrees away from the PLD 71, 6, 7, 8 or 9 degrees away from the PLD 71, and so on.

Thus, the rounded holes 40 may be oriented such that their respective major axes 46 are either perfectly aligned and parallel with the PLD 71, or rotated some number of degrees (but less than 90 degrees) from the PLD 71. And, since the support structure 20 of the present disclosure may be used for cases in which the primary load/PLD 70, 71 are not aligned or parallel with the longitudinal axis 28 of the support structure 21—i.e., the primary load/PLD 70, 71 point at some angle away from the longitudinal axis 28—then the rounded holes 40 may be oriented such that their major axes 46 are rotated more than 0 degrees and less than 90 degrees from the longitudinal axis 28 of the structural member 21. Similarly, the rounded holes 40 may be oriented such that their respective minor axes 48 are either perfectly perpendicular or orthogonal to the PLD 71, or rotated some number of degrees (greater than 0 but less than 90 degrees) from being perfectly perpendicular to the PLD 71. Each of the rounded holes 40 may be oriented with its minor axis 48 forming a second rotation angle $\theta_2$ with the transverse axis 30; thus, the rounded holes 40 may be oriented such that their minor axes 48 are either perfectly aligned with the transverse axis 30 (with essentially 0 degrees of difference between the second rotation angle $\theta_2$ and the transverse axis 30), or the minor axes 48 may be rotated more than 0 degrees and less than degrees from the transverse axis 30 (with the same number of degrees between the second rotation angle $\theta_2$ and the transverse axis 30).

Figure 6:
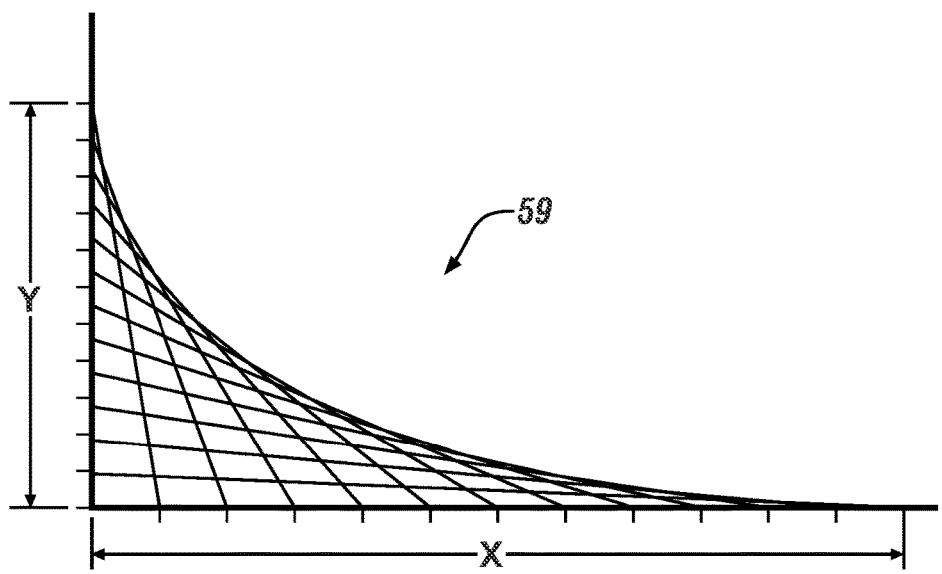
FIG. 6 is a schematic representation of a Grodzinski profile.
Figure 7:
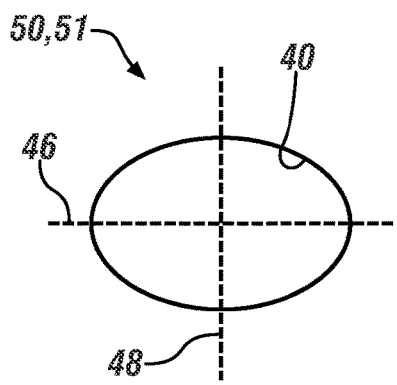
FIGS. 7-13 are elevation views of various rounded access hole shapes; namely, an ellipse, a Grodzinski-profiled hole, an oval, a rounded rectangle, a stadium, a rounded rhombus and a rounded trapezoid, respectively.
Figure 8:
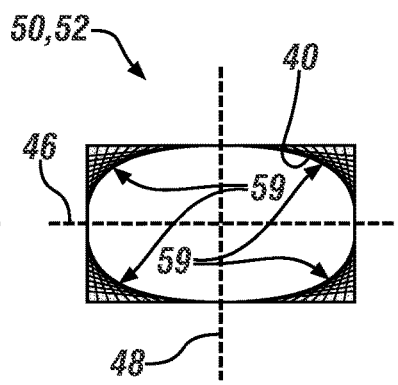
Figure 9:
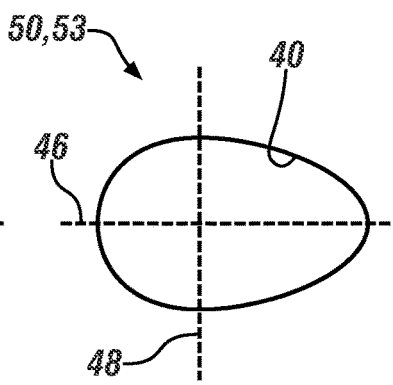
Figure 10:
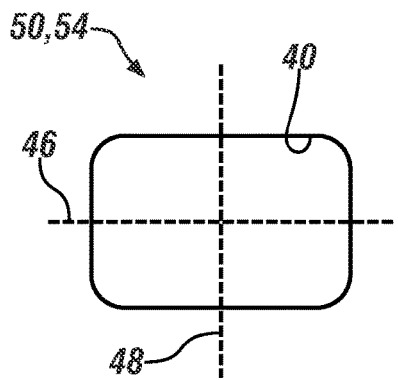
Figure 11:
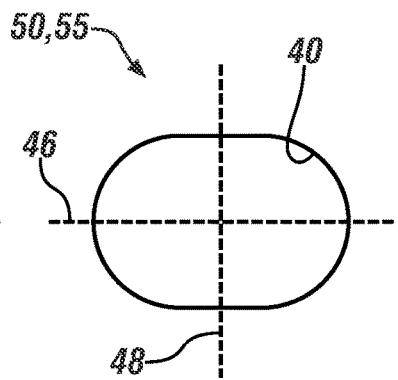
Figure 12:
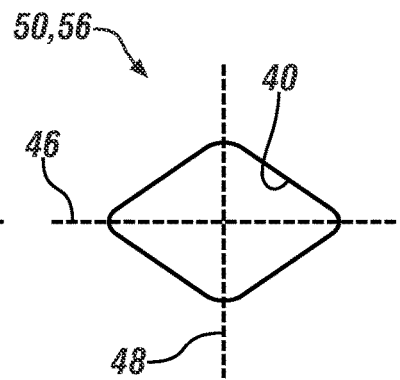
Figure 13:
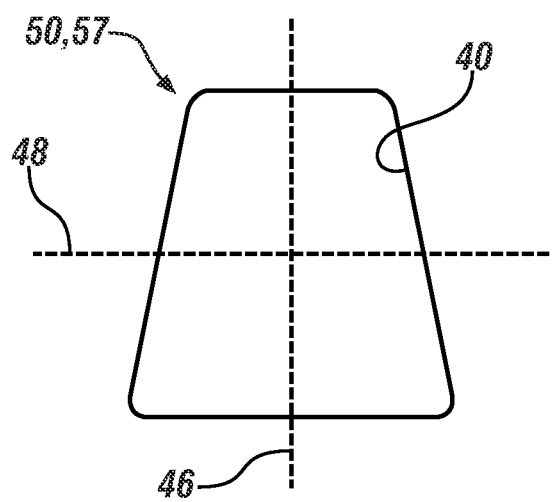

The rounded holes 40 provided in the structural member 21 may all have the same shape 50, or multiple different shapes 50 may be used. In some cases, each rounded hole 40 may even have its own shape 50 that is different from that used in all the other holes 40. Each of the holes 40 is "rounded", meaning that the shape 50 of the hole 40 has no sharp or abrupt corners, and instead will have rounded or smooth contours or fillets, which serve to minimize the stress concentration factor $K_T$ for each rounded corner or fillet. For example, as illustrated in FIGS. 7-13, each respective shape 50 may be an ellipse 51 (FIG. 7), a Grodzinski-profiled hole 52 (FIG. 8), an oval 53 (FIG. 9), a rounded rectangle 54 (FIG. 10), a stadium 55 (FIG. 11), a rounded rhombus 56 (FIG. 12) or a rounded trapezoid 57 (FIG. 13). It may be noted that the Grodzinski-profiled hole 52 of FIG. 8 may be formed by combining together four Grodzinski-profiled notches 59. FIG. 6 shows one such Grodzinski-profiled notch 59. This kind of notch 59 is formed by selecting a length X along the horizontal axis and a height Y (different from X) along the vertical axis, then dividing the length X and height Y into the same number of equally spaced increments (here twelve increments each), and then selectively connecting each horizontal increment with a respective vertical increment as shown. This results in a grid, which provides the characteristic Grodzinski profile along the curved edge of the grid as shown. Further, as shown in FIGS. 7-13, each of the shapes 50 has a major axis 46 and a minor axis 48 transverse or perpendicular to the major axis 46. These rounded holes 40 may serve as access holes 42 or window holes 44, depending on what purpose the structural member 21 is used for, as further described below.

Figure 4:
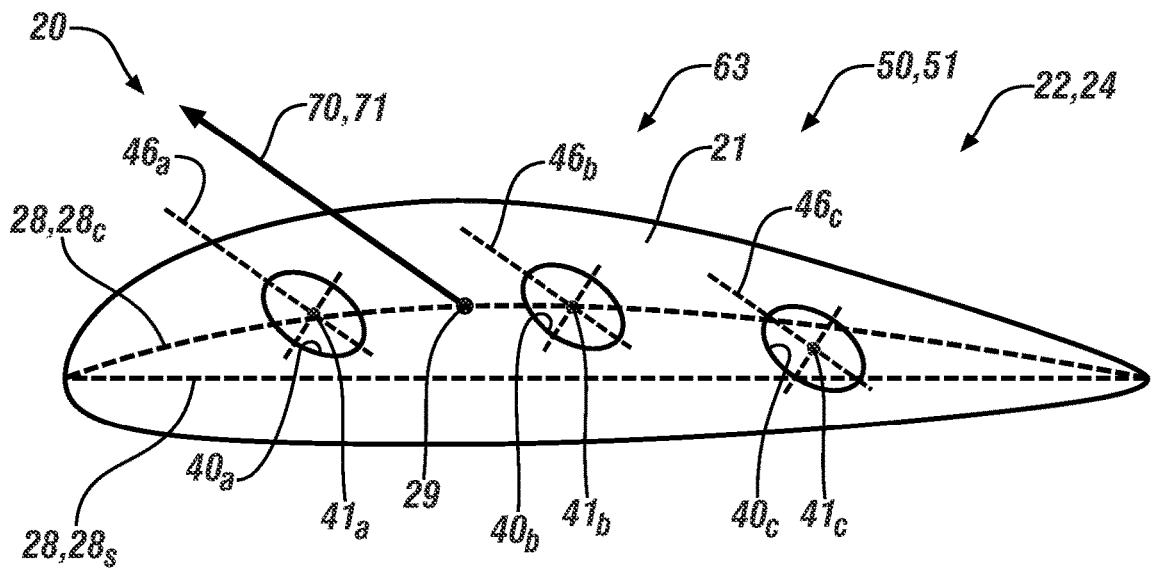
FIG. 4 is a schematic elevation view of a support structure having a generally flat planar shape and an arcuate longitudinal axis.
Figure 5:
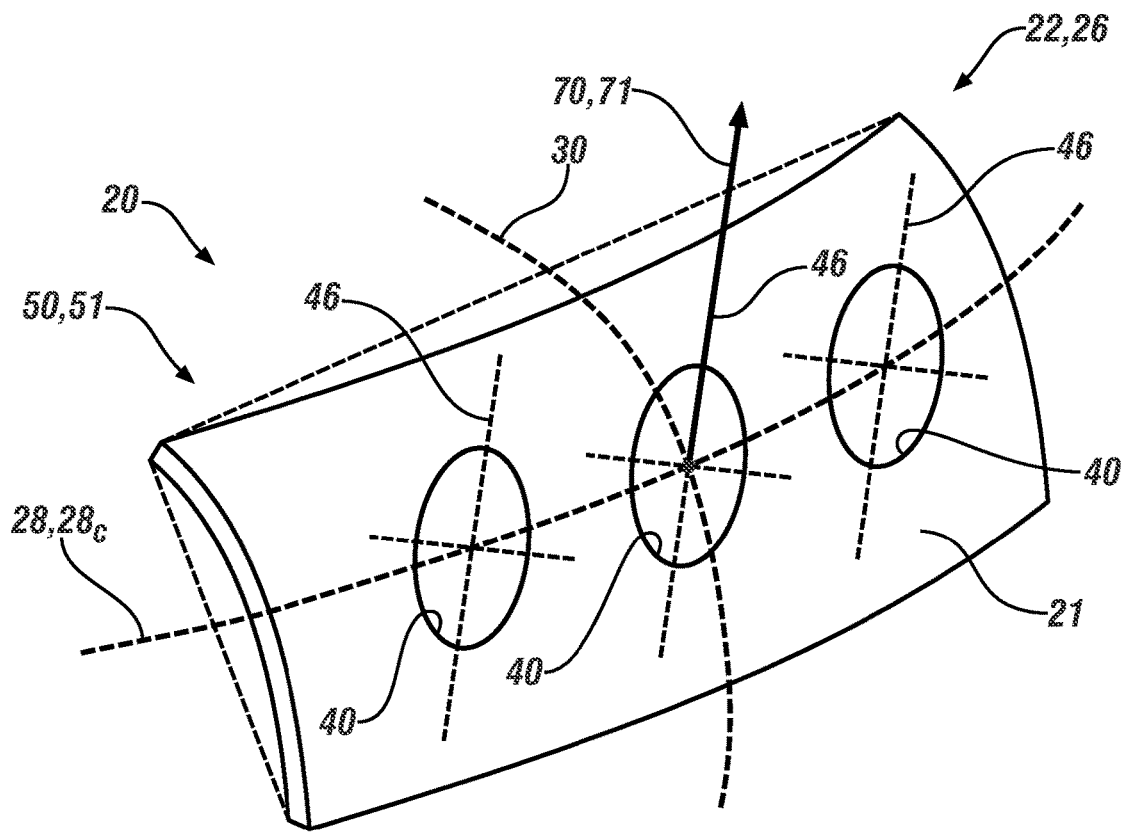
FIG. 5 is a schematic perspective view of a support structure having a generally curved planar shape and an arcuate longitudinal axis.

FIG. 4 shows another embodiment of the support structure 20, which may have the overall shape of a rib 63 as used in the wingbox of an aircraft wing. Here, the structural member 21 has three rounded holes $40_a$, $40_b$, $40_c$ whose major axes $46_a$, $46_b$, $46_c$ all point along the same direction as the primary load/PLD 70, 71. As is the case for the support structure 20 shown in FIGS. 2-3, the generally planar shape 22 of the support structure 20 shown in FIG. 4 is a generally flat planar shape 24. In contrast, the support structure 20 shown in FIG. 5 has a generally planar shape 22 which is more specifically a generally curved planar shape 26. It may be noted that the longitudinal axis 28 of the structural member 21 shown in FIGS. 2-3 is a straight longitudinal axis $28_s$, while the longitudinal axis 28 of the structural member 21 shown in FIG. 5 is a curved longitudinal axis $28_c$. Further, it may be noted that the transverse axis 30 of FIGS. 2-3 is straight, while the transverse axis 30 of FIG. 5 is curved.

The longitudinal axis 28 of the structural member 21 shown in FIG. 4 may either be the straight longitudinal axis $28_s$ (also called a chord line) or the curved longitudinal axis $28_c$ (also called a mean camber line). In either case, the rounded holes $40_a$, $40_b$, $40_c$ are disposed or located along the longitudinal axis 28 of the structural member 21. (Note that two of the three holes $40_a$, $40_b$ have their respective centers $41_a$, $41_b$ located on the curved longitudinal axis $28_c$, while the other hole $40_c$ has its center $41_c$ located between the straight and curved longitudinal axes $28_s$, $28_c$.)

Figure 14:
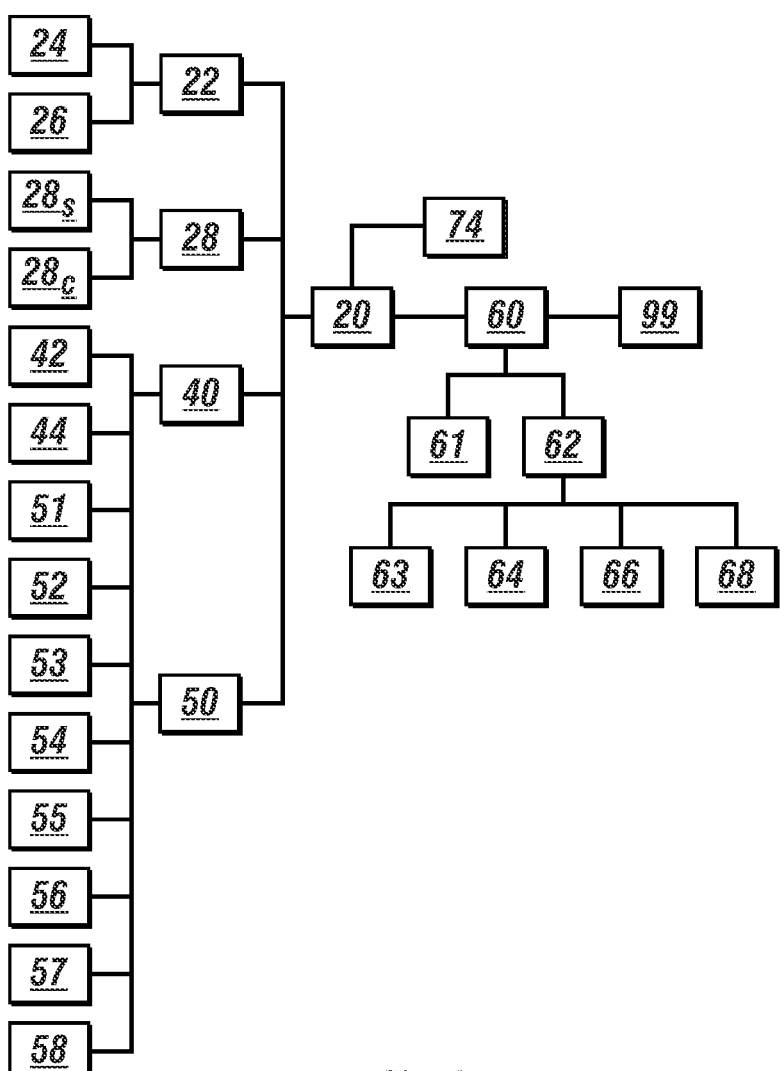
FIG. 14 is a block diagram illustrating various combinations of the present embodiments and their respective elements, features and characteristics.

FIG. 14 shows a block diagram of how the various elements, features and characteristics of the support structure 20 may be combined to provide one or more embodiments, which may interface with external members 74 and serve as a fuselage skin 61 or wingbox component 62 of an aircraft 99. In some embodiments, the structural member 21 may serve as a wingbox component 62, such as a rib 63, a spar 64, an upper skin 66 or a lower skin 68, and each of the rounded holes 40 may be an access hole 42 through the wingbox component 62. Alternatively, the structural member 21 may be a fuselage skin 61 and each of the rounded holes 40 may be a window hole 44 through the fuselage skin 61. The block diagram also indicates that the generally planar shape 22 may be a generally flat planar shape 24 or a generally curved planar shape 26, the longitudinal axis 28 may be a straight longitudinal axis $28_s$ or a curved longitudinal axis $28_c$, and the shape 50 of each rounded hole 40 may be an ellipse 51, a Grodzinski-profiled hole 52, an oval 53, a rounded rectangle 54, a stadium 55, a rounded rhombus 56, a rounded trapezoid 57 or some other rounded shape 58.

As noted above, the structural member 21 may be configured for bearing one or more external loads F acting on the structural member 21 in a principal loading direction 70 that is not parallel with the longitudinal axis 28 or the transverse axis 30. In this configuration, each of the rounded holes 40 may be oriented with its major axis 46 rotated more than 0 degrees and less than or equal to 45 degrees from the principal loading direction 70, or each of the rounded holes 40 may be oriented with its major axis 46 aligned parallel with the principal loading direction 70. The structural member 21 may further include a plurality of attachment points 72 configured for interfacing with one or more external members 74 and for receiving the one or more external loads F from the external members 74.

According to another embodiment, a support structure 20 for an aircraft 99 includes: a structural member 21 having a generally planar shape 22, a longitudinal axis 28 defining a longitudinal direction 32, and a transverse axis 30 orthogonal to the longitudinal axis 28, wherein the structural member 21 includes a plurality of attachment points 72 configured for interfacing with one or more external members 74 and for receiving one or more external loads F from the external members 74 acting on the structural member 21 in a principal loading direction that is not parallel with the longitudinal axis 28 or the transverse axis 30; and a plurality of rounded holes 40 formed along the longitudinal direction 32, wherein each rounded hole 40 has a respective major axis 46 with a major length $L_{maj}$ therealong and a minor axis 48 orthogonal to the major axis 46 with a minor length $L_{min}$ therealong that is less than the major length $L_{maj}$, wherein each of the rounded holes 40 is oriented with its major axis 46 aligned parallel with the principal loading direction 70.

In this embodiment, each of the rounded holes 40 may have a respective shape 50, and each respective shape 50 may be an ellipse 51, a Grodzinski-profiled hole 52, an oval 53, a rounded rectangle 54, a stadium 55, a rounded rhombus 56 or a rounded trapezoid 57. The generally planar shape 22 of the structural member 21 may be a generally flat planar shape 24 or a generally curved planar shape 26, and the longitudinal axis 28 of the structural member 21 may be a straight longitudinal axis $28_s$ or a curved longitudinal axis $28_c$. Each of the rounded holes 40 may be oriented with its major axis 46 rotated more than 0 degrees and less than or equal to 45 degrees from the principal loading direction 70. The structural member 21 may be a wingbox component 62 comprising one of a rib 63, a spar 64, an upper skin 66 and a lower skin 68, and each of the rounded holes 40 may be an access hole 42 through the wingbox component 62. Alternatively, the structural member 21 may be a fuselage skin 61 and each of the rounded holes may be a window hole 44 through the fuselage skin 61.

According to yet another embodiment, a support structure 20 for a wingbox or a fuselage of an aircraft 99 includes: a structural member 21 having a generally planar shape 22, a longitudinal axis 28 defining a longitudinal direction 32, and a transverse axis 30 orthogonal to the longitudinal axis 28, wherein the structural member 21 includes a plurality of attachment points 72 configured for interfacing with one or more external members 74 and for receiving one or more external loads F from the external members 74 acting on the structural member 21 in a principal loading direction 70 that is not parallel with the longitudinal axis 28 or the transverse axis 30; and a plurality of generally elliptical holes 40 formed along the longitudinal direction 32 of the structural member 21, wherein each generally elliptical hole 40 has a respective major axis 46 with a major length $L_{maj}$ therealong and a minor axis 48 orthogonal to the major axis 46 with a minor length $L_{min}$ therealong that is less than the major length $L_{maj}$. Each of the generally elliptical holes is oriented with its major axis 46 aligned parallel with the principal loading direction 70, and the structural member 21 is: (i) a wingbox component 62 comprising one of a rib 63, a spar 64, an upper skin 66 and a lower skin 68, with each of the rounded holes 40 being an access hole 42 through the wingbox component 62, or (ii) a fuselage skin 61 with each of the rounded holes 40 being a window hole 44 through the fuselage skin 61.

Each of the generally elliptical holes 40 may have a respective shape 50, and each respective shape 50 may be an ellipse 51, a Grodzinski-profiled hole 52, an oval 53, a rounded rectangle 54 or a stadium 55. The generally planar shape 22 of the structural member 21 may be generally flat or generally curved, and the longitudinal axis 28 of the structural member 21 may be straight or curved. Each of the generally elliptical holes 40 may be oriented with its major axis 46 rotated more than 0 degrees and less than or equal to 45 degrees from the principal loading direction 70.

The above description is intended to be illustrative, and not restrictive. While the dimensions and types of materials described herein are intended to be illustrative, they are by no means limiting and are exemplary embodiments. In the following claims, use of the terms "first", "second", "top", "bottom", etc. are used merely as labels, and are not intended to impose numerical or positional requirements on their objects. As used herein, an element or step recited in the singular and preceded by the word "a" or "an" should be understood as not excluding plural of such elements or steps, unless such exclusion is explicitly stated. Additionally, the phrase "at least one of A and B" and the phrase "A and/or B" should each be understood to mean "only A, only B, or both A and B". Moreover, unless explicitly stated to the contrary, embodiments "comprising" or "having" an element or a plurality of elements having a particular property may include additional such elements not having that property. And when broadly descriptive adverbs such as "substantially" and "generally" are used herein to modify an adjective, these adverbs mean "mostly", "mainly", "for the most part", "to a significant extent", "to a large degree" and/or "at least 51 to 99% out of a possible extent of 100%", and do not necessarily mean "perfectly", "completely", "strictly", "entirely" or "100%". Additionally, the word "proximate" may be used herein to describe the location of an object or portion thereof with respect to another object or portion thereof, and/or to describe the positional relationship of two objects or their respective portions thereof with respect to each other, and may mean "near", "adjacent", "close to", "close by", "at" or the like.

This written description uses examples, including the best mode, to enable those skilled in the art to make and use devices, systems and compositions of matter, and to perform methods, according to this disclosure. It is the following claims, including equivalents, which define the scope of the present disclosure.

What is claimed is:

1. A support structure of an aircraft having a wing, the support structure comprising:
   a wingbox rib structurally configured to attach to the wing of the aircraft, the wingbox rib including a structural member having a generally planar shape, a fore-aft length, a vertical height orthogonal to and smaller than the fore-aft length, a longitudinal axis parallel to the fore-aft length, and a transverse axis orthogonal to the longitudinal axis and parallel to the vertical height; and
   a plurality of rounded holes formed in the structural member and spaced from each other along the longitudinal axis, wherein the rounded holes are configured to allow one or more of a hydraulic line, an electrical line, or a fuel line to pass therethrough, wherein each of the rounded holes has a respective major axis with a major length therealong and a minor axis orthogonal to the major axis with a minor length therealong that is less than the major length,
   wherein each of the rounded holes is oriented with its major axis rotated more than 0 degrees and less than or equal to 45 degrees from the longitudinal axis of the structural member.

2. The support structure of claim 1, wherein each of the rounded holes has a shape including a Grodzinski-profiled hole.

3. The support structure of claim 1, wherein the generally planar shape of the structural member is flat and the longitudinal axis of the structural member is straight.

4. The support structure of claim 1, wherein each of the rounded holes is oriented with its minor axis rotated counterclockwise more than 0 degrees and less than 45 degrees from the transverse axis of the structural member.

5. The support structure of claim 1, wherein the wingbox rib is flat.

6. The support structure of claim 5, wherein the wingbox rib has curved edges, and wherein each of the rounded holes is an access hole through the wingbox rib.

7. The support structure of claim 1, wherein the structural member is configured for bearing one or more external loads acting on the structural member in a principal loading direction that is not parallel with the longitudinal axis or the transverse axis, and wherein each of the rounded holes is oriented with its major axis rotated more than 0 degrees and less than or equal to 45 degrees from the principal loading direction.

8. The support structure of claim 1, wherein the structural member is configured for bearing one or more external loads acting on the structural member in a principal loading direction that is not parallel with the longitudinal axis or the transverse axis, and wherein each of the rounded holes is oriented with its major axis aligned parallel with the principal loading direction.

9. The support structure of claim 8, wherein the structural member includes a plurality of attachment points configured for interfacing with one or more external members and for receiving the one or more external loads from the external members.

10. The support structure of claim 1, wherein the major axis of each of the plurality of rounded holes is aligned and parallel with a principal loading direction, wherein the minor axis of each of the plurality of rounded holes is aligned and parallel with a transverse axis, and perpendicular to the principal loading direction.

11. A support structure of an aircraft having a wing, the support structure comprising:
    a wingbox rib structurally configured to mount inside the wing of the aircraft, the wingbox rib including a structural member having a generally planar shape, a fore-aft length, a vertical height orthogonal to and smaller than the fore-aft length, a longitudinal axis parallel to the fore-aft length, and a transverse axis orthogonal to the longitudinal axis and parallel to the vertical height, wherein the structural member includes a plurality of attachment points configured for interfacing with one or more external members and for receiving one or more external loads from the external members acting on the structural member in a principal loading direction that is not parallel with the longitudinal axis or the transverse axis; and
    a plurality of rounded holes formed in the structural member and spaced from each other along the longitudinal axis, wherein the rounded holes are configured to allow one or more of a hydraulic line, an electrical line, or a fuel line to pass therethrough, wherein each of the rounded holes has a respective major axis with a major length therealong and a minor axis orthogonal to the major axis with a minor length therealong that is less than the major length,
    wherein each of the rounded holes is oriented with its major axis rotated 45 degrees or less from the longitudinal axis and aligned parallel with the principal loading direction.

12. The support structure of claim 11, wherein each of the rounded holes has a shape including an ellipse, a Grodzinski-profiled hole, an oval, a rounded rectangle, a stadium, a rounded rhombus or a rounded trapezoid.

13. The support structure of claim 11, wherein the generally planar shape of the structural member is flat and the longitudinal axis of the structural member is straight.

14. The support structure of claim 11, wherein each of the rounded holes has an oval or elliptical shape.

15. The support structure of claim 11, wherein the wingbox rib is generally flat, and wherein each of the rounded holes is an access hole through the wingbox rib.

16. The support structure of claim 15, wherein the wingbox rib has curved edges.

17. An aircraft, comprising: an
    aircraft fuselage;
    an aircraft wing attached to the aircraft fuselage;

a wingbox rib attached to the aircraft wing, the wingbox rib including a structural member having a generally planar shape, a fore-aft length, a vertical height orthogonal to and smaller than the fore-aft length, a longitudinal axis parallel to the fore-aft length, and a transverse axis orthogonal to the longitudinal axis and parallel to the vertical height, wherein the structural member includes a plurality of attachment points configured for interfacing with one or more external members and for receiving one or more external loads from the external members acting on the structural member in a principal loading direction that is not parallel with the longitudinal axis or the transverse axis; and a plurality of elliptical holes formed in the structural member and spaced from each other along the longitudinal axis, wherein the elliptical holes are configured to allow one or more of a hydraulic line, an electrical line, or a fuel line to pass therethrough, wherein each of the elliptical holes has a respective major axis with a major length therealong and a minor axis orthogonal to the major axis with a minor length therealong that is less than the major length, wherein each of the elliptical holes is oriented with its major axis rotated 45 degrees or less from the longitudinal axis and aligned parallel with the principal loading direction, and wherein each of the elliptical holes is an access hole through the wingbox rib.

18. The aircraft of claim 17, wherein each of the elliptical holes has a respective shape, and each respective shape is an ellipse, a Grodzinski-profiled hole, or an oval.

19. The aircraft of claim 17, wherein the generally planar shape of the structural member is flat and the longitudinal axis of the structural member is straight.

20. The aircraft of claim 17, wherein each of the elliptical holes is oriented with its major axis rotated more than 0 degrees and less than or equal to 45 degrees from the principal loading direction.

21. The aircraft of claim 17, wherein the wingbox rib is generally flat with curved edges.

* * * * *